United States Patent
Gelke et al.

(10) Patent No.: US 6,735,661 B2
(45) Date of Patent: May 11, 2004

(54) INTEGRATED CIRCUIT WITH FLASH MEMORY INCLUDING DEDICATED FLASH BUS AND FLASH BRIDGE

(75) Inventors: Hans-Joachim Gelke, Zurich (CH); Stefan Koch, Zurich (CH); Steffen Gappisch, Zurich (CH)

(73) Assignee: Koninklijke Philips Electronics N.V., Eindhoven (NL)

(*) Notice: Subject to any disclaimer, the term of this patent is extended or adjusted under 35 U.S.C. 154(b) by 197 days.

(21) Appl. No.: 09/891,449

(22) Filed: Jun. 26, 2001

(65) Prior Publication Data

US 2002/0013874 A1 Jan. 31, 2002

(30) Foreign Application Priority Data

Jun. 27, 2000 (EP) .............................. 00113609

(51) Int. Cl.[7] .............................................. G06F 13/40
(52) U.S. Cl. .......................... 710/307; 710/66; 711/171
(58) Field of Search ................................. 710/305–317, 710/66; 711/113, 138, 142, 143, 146, 149, 171

(56) References Cited

U.S. PATENT DOCUMENTS

| | | | | |
|---|---|---|---|---|
| 5,113,506 A | * | 5/1992 | Moussouris et al. ............ 711/3 |
| 5,493,534 A | | 2/1996 | Mok ........................... 365/226 |
| 5,726,937 A | * | 3/1998 | Beard ..................... 365/185.33 |
| 5,732,241 A | * | 3/1998 | Chan ........................... 711/131 |
| 5,768,287 A | * | 6/1998 | Norman et al. ............. 714/719 |
| 5,802,602 A | * | 9/1998 | Rahman et al. ............. 711/204 |
| 5,822,251 A | * | 10/1998 | Bruce et al. ........... 365/185.33 |
| 5,860,097 A | * | 1/1999 | Johnson et al. ............. 711/128 |
| 5,903,916 A | * | 5/1999 | Pawlowski et al. ......... 711/167 |
| 5,937,174 A | * | 8/1999 | Weber ........................ 710/312 |
| 5,937,423 A | * | 8/1999 | Robinson .................... 711/103 |
| 5,974,493 A | * | 10/1999 | Okumura et al. ........... 710/307 |
| 6,026,027 A | | 2/2000 | Terrell, II et al. ....... 365/185.33 |
| 6,088,777 A | * | 7/2000 | Sorber ........................ 711/171 |
| 6,157,973 A | * | 12/2000 | Ohtani et al. ............... 710/100 |

(List continued on next page.)

FOREIGN PATENT DOCUMENTS

| | | | | |
|---|---|---|---|---|
| JP | 02272654 A | * | 11/1990 | .......... G06F/12/08 |
| JP | 2000276402 A | * | 10/2000 | .......... G06F/12/08 |
| WO | 0025208 A1 | | 5/2000 | |
| WO | 0025250 A1 | | 5/2000 | |

OTHER PUBLICATIONS

IEEE The Authoritative Dictionary of IEEE Standards Terms p. 716.*

(List continued on next page.)

Primary Examiner—Paul R. Myers
(74) Attorney, Agent, or Firm—Michael J. Ure

(57) ABSTRACT

This invention relates to the structure and design of microprocessor ICs, in particular to the embedding or integration of a non-volatile, so-called flash memory into an ICs. Such a flash memory may be integrated by providing a dedicated flash bus which operationally links the flash memory with one or more microprocessors on the IC. Unfortunately, flash memories have relatively long access times compared to usual modern microprocessors. To achieve that the flash memory keeps pace with the microprocessor(s), a dedicated flash bus (2) links the flash memory (1) to the microprocessor (3), said flash bus (2) having a width m which is greater than the width n of the microprocessor's data bus (8). Preferably, width m is a multiple of width n. A plurality of intermediate storage registers (4) connects the flash bus (2) with the data bus (8) of the microprocessor (3) for performing the width conversion. These intermediate storage registers (4), together with an additional tag register (5), may serve as cache for the microprocessor's data requests, further increasing the potential speed of the IC.

7 Claims, 3 Drawing Sheets

U.S. PATENT DOCUMENTS

| | | | |
|---|---|---|---|
| 6,272,610 B1 * | 8/2001 | Katayama et al. | 711/171 |
| 6,282,643 B1 * | 8/2001 | Cromer et al. | 713/2 |
| 6,295,218 B1 * | 9/2001 | Osada et al. | 365/49 |
| 6,321,315 B1 * | 11/2001 | LaBerge | 711/167 |
| 6,425,065 B2 * | 7/2002 | DiMarco et al. | 711/212 |
| 6,434,674 B1 * | 8/2002 | DeWilde et al. | 711/149 |
| 2002/0011607 A1 * | 1/2002 | Gelke et al. | 257/200 |
| 2002/0013874 A1 * | 1/2002 | Gelke et al. | 710/305 |
| 2002/0144059 A1 * | 10/2002 | Kendall | 711/118 |

OTHER PUBLICATIONS

Dictionary of Computer Information Processing & Telecommunications p. 399.*

* cited by examiner

INTEGRATED CIRCUIT WITH FLASH MEMORY INCLUDING DEDICATED FLASH BUS AND FLASH BRIDGE

FIELD OF THE INVENTION

The present invention relates to the structure and design of integrated circuits (ICs), in particular to the embedding or integration of a non-volatile, flash memory into an IC. This embedding or integration of non-volatile memory with a microprocessor is often desired or even required for ICs to be used in mobile phones, personal digital assistants, in GPS applications for automobile or other navigation purposes.

BACKGROUND OF THE INVENTION

Embedding a flash memory into a chip leads to certain problems that have to be solved before such embedding exhibits the expected advantages. One of the issues is that, by "nature", the access times of usual flash memories differ significantly from the access times of the other components on the IC.

Thus, the present invention intends to provide a solution to the specific problematic aspect that the absolute speed of flash memory is quite low compared to many components on a given IC, in particular compared to any read-only-memory (ROM) or today's fast microprocessors and/or their buses.

A flash or other non-volatile memory embedded into an IC is, for example, shown in the published PCT applications WO 0025208 by Feldman et al. and WO 0025250 by Ozcelik et al. Neither of these two patent publications addresses, however, the above-identified issue, namely the differing data path widths between flash memory and processor(s) on the IC. U.S. Pat. No. 5,493,534 by Mok gets a little closer by showing a electronically programmable and erasable program memory for a microcontroller embedded on a chip which is isolated, so-to-speak, from the processor bus by buffers. But again, Mok does not give a clear and convincing solution to the problem of the differing data widths of the bus and the flash memory.

To really exploit the potential of a flash memory integrated with one or more microprocessors, the flash memory's overall access time must keep pace with the microprocessors' clocking rates to achieve the expected performance. Since, as mentioned above, flash memories usually have relatively long access times, problems are unavoidable when operating an associated microprocessor at a higher clocking rate than the flash memory access time.

SUMMARY OF THE INVENTION

Here, the present invention provides a solution. It describes a way for improving the function of embedded flash memory in a processor environment on an IC, with the emphasis on maximizing performance, by proposing a number of inventive measures which serve to increase the overall speed of such ICs.

In brief, the present invention solves the above-identified issues by one or both of two measures:

1. One measure is to increase the embedded flash memory's data word width to compensate for its access time performance.
2. The other measure is to provide a data cache, in particular by using intermediate data storage registers as single or multiple line data caches.

There are other additions and variations envisageable from the following description of an embodiment which describes an IC with a flash memory, a dedicated flash bus, and a number of flash memory supporting blocks, in particular the connections or bridges to the processor (or even multiprocessor) environment. These bridges will be called "flash bridges" in the following.

The first above-mentioned measure is to increase the data word width of the embedded flash memory to a multiple of the width of processor bus. A flash bridge connecting the flash memory with the processor bus then accesses the flash memory by swapping a whole block of processor data words into an intermediate storage register at one time. The processor can now fetch a word at a time from the intermediate storage register without the flash memory being accessed on every processor fetch cycle. Of course, multiple intermediate storage registers may be used.

The second above-mentioned measure is to provide an address tag register which allows using the intermediate data storage registers as a cache with one or more lines. Recently used accesses may now directly be supplied by the intermediate storage registers, avoiding flash memory accesses even if the microprocessor accesses are not strictly sequential. Only if the required address is not in the cache, the flash memory must be accessed and the intermediate storage registers will be updated. This caching concept is used as "secondary cache" only for the flash memory and differs insofar from common caches, i.e. the flash bridge mentioned above is used as a secondary cache for buffer accesses to the flash memory only. So-called secondary caches are placed in series with a primary cache which is directly connected to the processor. Their principle is well known in the art and need not be described further.

In the following, an example for an implementation of the present invention will be shown. Three figures illustrate this implementation on an IC with an embedded flash memory.

DETAILED DESCRIPTION OF THE INVENTION

Figure 1:
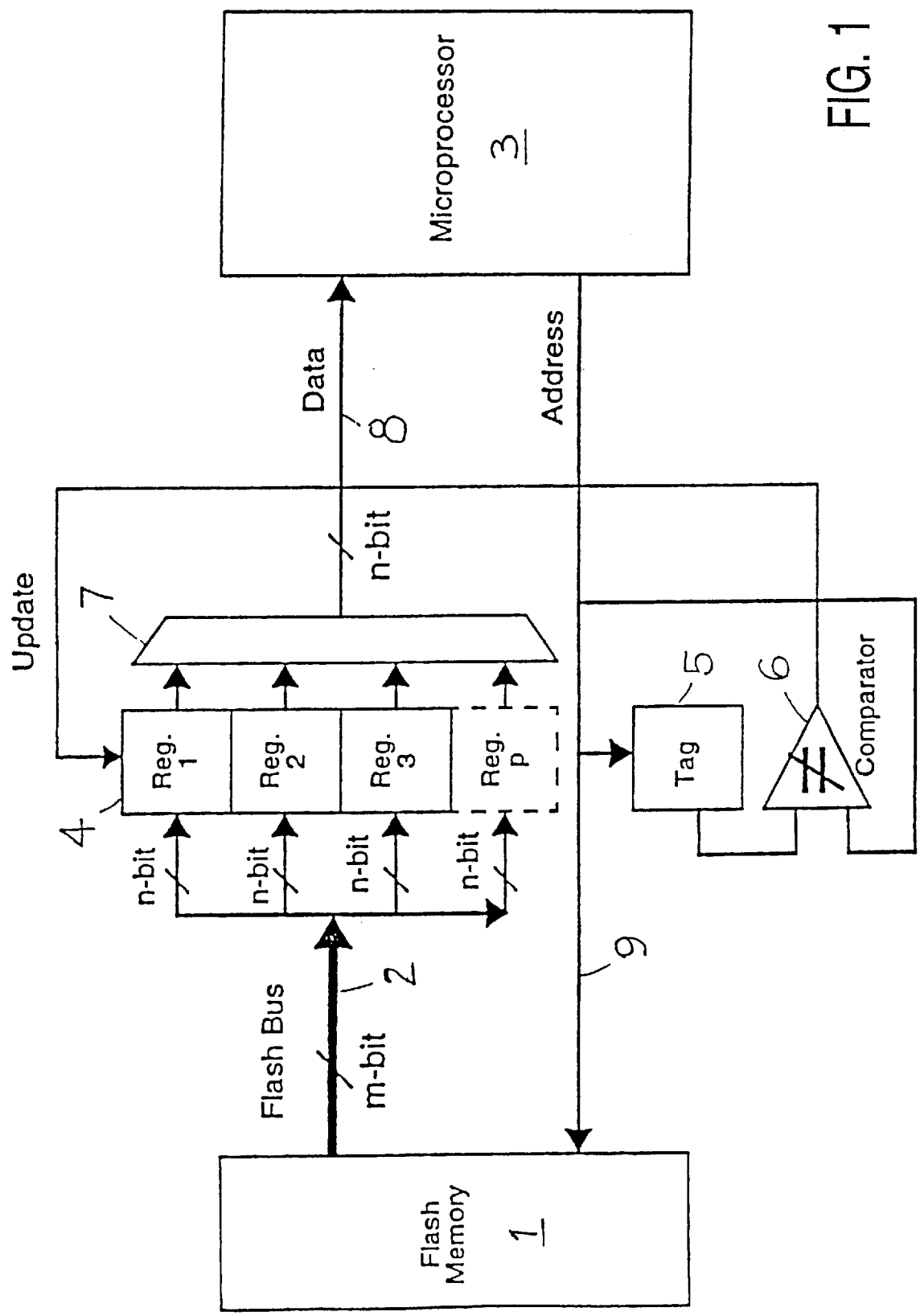
FIG. 1 shows an overall system including the data path of a flash bridge.

FIG. 1 shows the read data path of a flash bridge, connecting a flash memory 1 with a microprocessor 3. The data bus 2 exiting the flash memory 1 is m bits wide, its width m is a multiple p of width n of the microprocessor's data bus 8, i.e. m=p*n, with p being the number of registers. This bank of registers 4 (Reg. 1 to Reg. p in FIG. 1) functions as intermediate storage. Once a memory line of width m is transferred into the register bank 4, the microprocessor is able to read the n bits at a time via the multiplexer 7 and the data bus 8. This is particular advantageous if the microprocessor access is sequential, since the flash memory 1 does not have to be accessed on every processor read cycle.

Further, as indicated above, the register bank 4 may be used as a cache. To accomplish this, the current microprocessor bus address, which is transferred on an address bus 9 is stored in a tag register 5. On subsequent processor cycles, the tag file in tag register 5, containing the previous address, is compared with the current address by comparator 6, checking whether data from a previous access are already in the registers of bank 4. If so, i.e. if the addresses match, the flash memory 1 need not be accessed since the requested data is already in one of the registers of bank 4 and may be fetched by the microprocessor 3 via multiplexer 7.

Figure 2:
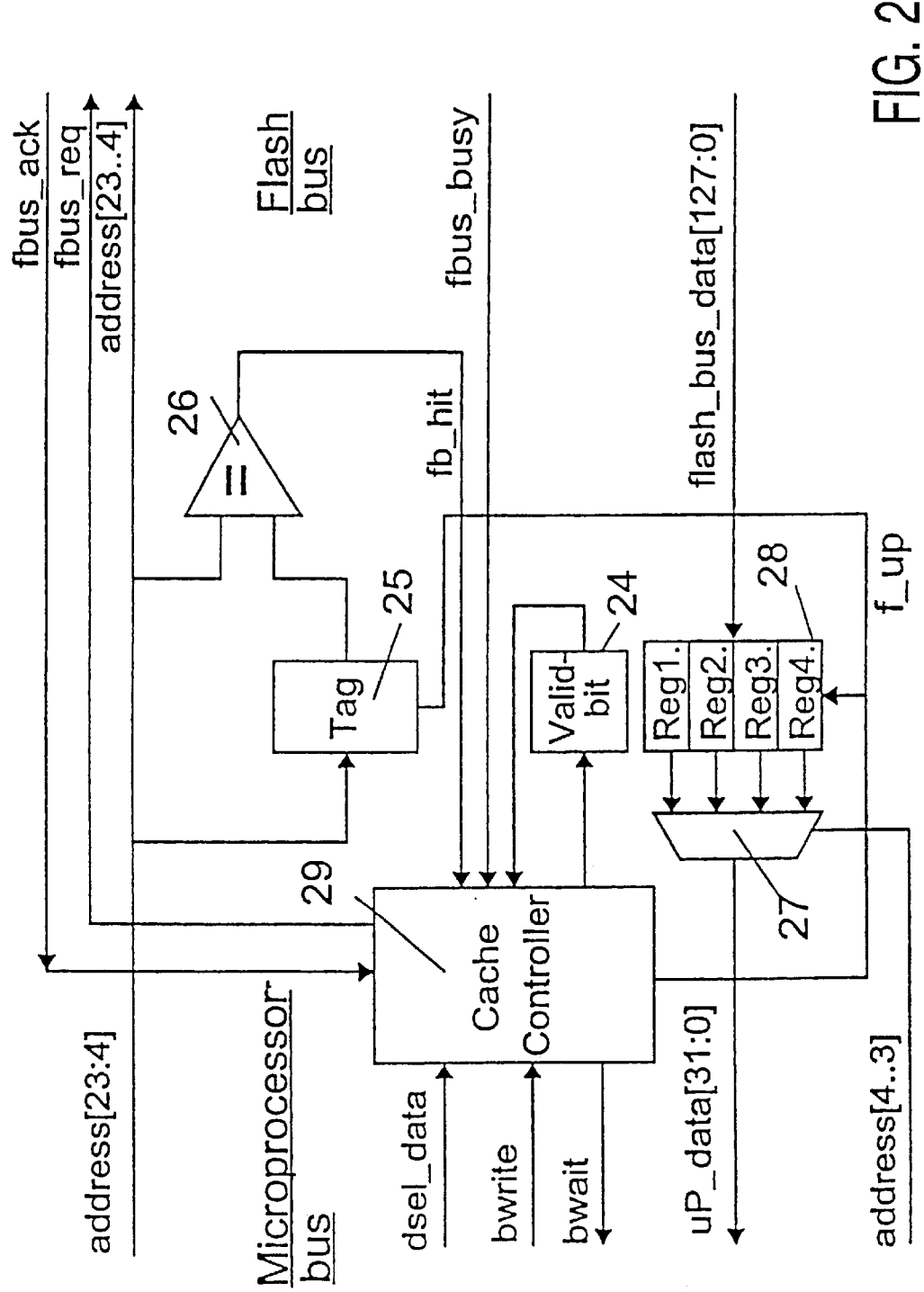
FIG. 2 illustrates an implementation in an IC for a mobile terminal.
Figure 3:
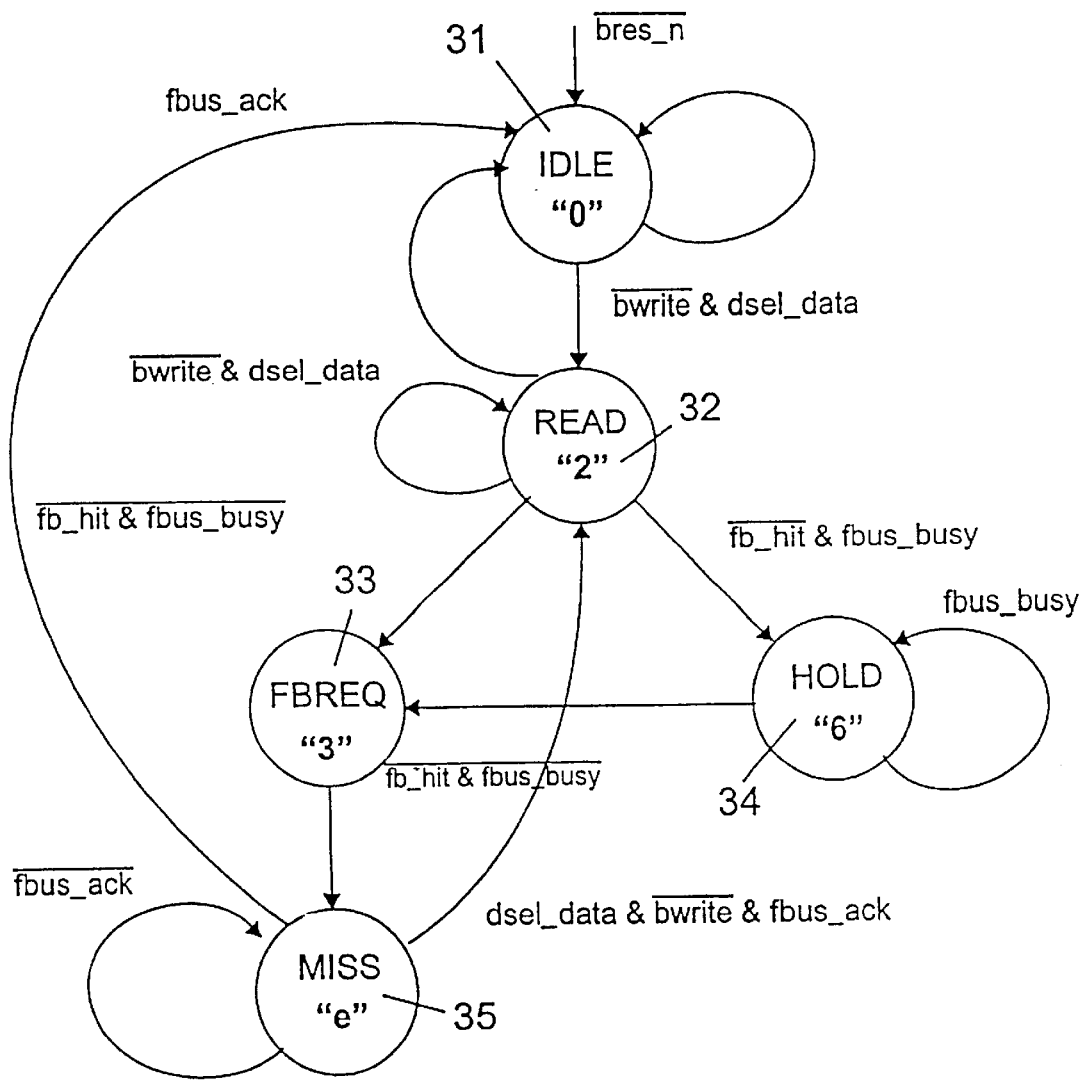
FIG. 3 shows the various states of the cache controller in FIG. 2.

FIGS. 2 and 3 show an implementation of the invention in a baseband IC for a mobile terminal, picturing those parts of the system which are significant for the invention.

A cache controller 29 controls all read accesses of the flash bridge to the flash memory (not shown in FIG. 2) via the flash bus. The cache controller 29 consists of a state machine and some logic components. The state diagram of this state machine is shown in FIG. 3.

During reset, i.e. when signal bres_n is active or if there are no microprocessor read cycles pending, the state machine is in IDLE state 31 (see FIG. 3).

When the cache controller 29 detects a read access from the microprocessor to any of the read data registers Reg1 . . . Reg4 in the bank 28 of the flash bridge, i.e. signal dsel_data is active and signal bwrite is inactive, the cache controller 29 executes a read cycle by advancing its state machine to the READ state 32. During this read cycle, the flash bridge compares the value of its tag register 25 with the address from the microprocessor, i.e. address(23..4) in comparator 26, and checks whether the valid bit 24 is set. A hit, i.e. fb_hit='1' on the comparator's output and a set valid bit 24, means that the data in the read data register bank 28 are valid and can therefore be put immediately onto the microprocessor data bus uP_data(31..0). In this case, no wait states are inserted into the microprocessor bus cycle.

However, if fb_hit remains inactive during a READ state of the cache controller 29, or if the valid bit 24 is not set, the state machine jumps to the FBREQ (Flash Bus Request) state 33 (see FIG. 3), the microprocessor wait signal bwait is immediatly activated and the flash bus is requested to execute a flash bus read cycle. This is done by activating the flash bus request signal fbus_req. As illustrated in FIG. 3, after the FBREQ state 33, the state machine unconditionaly jumps to the MISS state 35. During this MISS state 35, the cache controller 29 waits for data from the flash memory. The flash bus informs the cache controller 29 when these data are available by activating the acknowledge signal fbus_ack (FIGS. 2 and 3). During the time the cache controller 29 is waiting for data available, the microprocessor bus is signaled to wait by the microprocessor signal bwait. When the data from the flash memory are available, the cache controller 29 activates signal f_up (FIG. 2) which causes the register bank 28 to be updated with the data from the flash memory, and the bit which indicates that the data stored in register bank 28 are valid, valid bit 24, is set.

The state machine of the cache controller then jumps back to the IDLE state 31 unless there is another read cycle pending to read the data register in bank 28. In this case, the state machine will immediately jump to the READ state 32.

If, during a read cycle, a miss is detected and thus the flash bus must be requested but is not available because it is busy with another transaction, the cache controller state machine jumps into the HOLD state 34, where it waits until the pending transaction is completed. The flash bus busy signal fbus_busy is the indication for the cache controller state machine that the flash bus is busy doing other transactions.

In the example shown, the flash memory data width of 128 bits together with the four 32-bit read data registers Reg1 to Reg4 of bank 28 represent a cache line of 128 bits. The microprocessor data bus is 32 bits wide. The flash data bus and the microprocessor data bus are connected via a four-to-one multiplexer 27. Address 3 and 4 of the microprocessor address bus determine which of the four 32-bit read data registers Reg1 through Reg4 is connected to the microprocessor data bus.

Though the invention has been shown in a single embodiment only, the person skilled in the art can easily introduce modifications and variations according to the above-described principles without departing from the invention and the scope of the following claims.

What is claimed is:

1. An integrated circuit with at least one microprocessor and at least one memory, wherein said memory is a non-volatile or flash memory operationally linked by a dedicated flash bus to said microprocessor, said dedicated flash bus has a first width m greater than, in particular a multiple of, a second width n of said microprocessor or its data bus, respectively, a register serving as address tag register for storing accessed addresses of the flash memory, and a comparator for comparing current addresses requested by the microprocessor or its data bus with previously accessed and stored addresses in said flash memory, wherein data from recently used accesses may be supplied directly from the intermediate storage registers acting as cache for said microprocessor.

2. The integrated circuit of claim 1, wherein the processor data bus is n=32 bit wide, the flash bus is m=128 bit wide, and four intermediate storage registers are provided.

3. The integrated circuit according to claim 1, wherein the multiplexer is a four-to-one multiplexer, providing a cache line of 128 bits to the microprocessor.

4. The integrated circuit of claim 1, further comprising:

a bank of intermediate storage registers, connecting the flash bus with the microprocessor, for performing the width conversion, wherein the bank of intermediate storage registers stores m bit wide data fetched from the memory, and wherein each storage register is n bit wide, and a multiplexer for multiplexing the data in the bank of intermediate storage registers to the microprocessor bus, wherein the multiplexer receives n bits of data from each intermediate storage register.

5. The integrated circuit according to claim 1, further comprising cache control means for controlling the function of at least some components of the integrated circuit, in particular those components responsible for the loading and unloading of the intermediate storage registers.

6. The integrated circuit according to claim 5, wherein the cache control means is equipped to introduce wait states into a cycle of the microprocessor whenever said cache control means is waiting for data becoming available.

7. The integrated circuit according to claim 5, wherein the cache control means is a state machine with five states, in particular an IDLE state, a READ state, a FBREQ (Flash Bus Request) state, a HOLD state, and a MISS state.

* * * * *